(12) United States Patent
Chen et al.

(10) Patent No.: US 8,300,194 B2
(45) Date of Patent: Oct. 30, 2012

(54) LIQUID CRYSTAL DISPLAY HAVING COMPOSITE TAPE FOR PREVENTING ELECTROSTATIC DISCHARGE DAMAGE

(75) Inventors: Hsin-Hung Chen, Tainan County (TW); Pai-Hung Hsiao, Tainan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 600 days.

(21) Appl. No.: 12/327,309

(22) Filed: Dec. 3, 2008

(65) Prior Publication Data

US 2009/0141209 A1 Jun. 4, 2009

(30) Foreign Application Priority Data

Dec. 4, 2007 (TW) .............................. 96146097 A

(51) Int. Cl.
*G02F 1/1345* (2006.01)
*G02F 1/1333* (2006.01)

(52) U.S. Cl. .......................................... 349/149; 349/58
(58) Field of Classification Search ..................... 349/58, 349/149

See application file for complete search history.

(56) References Cited

U.S. PATENT DOCUMENTS

2003/0094305 A1* 5/2003 Ueda ............................. 174/254
2006/0110949 A1* 5/2006 Jee et al. .......................... 439/64
2008/0137020 A1* 6/2008 Takahashi et al. ............ 349/150

FOREIGN PATENT DOCUMENTS

CN 1779517 6/2006

OTHER PUBLICATIONS

Chinese language office action dated Nov. 17, 2011.
English language translation of abstract of CN 1779517 (published Jun. 8, 2006).

* cited by examiner

*Primary Examiner* — Michael Caley
(74) *Attorney, Agent, or Firm* — Thomas|Kayden

(57) ABSTRACT

A liquid crystal display panel and a liquid crystal display apparatus are disclosed. The apparatus comprises a liquid crystal display panel, a backlight module and a composite tape. The composite tape is assembled to the liquid crystal display panel and the backlight module, wherein the composite tape comprises an insulating layer, a first adhesive layer and an electrically conductive layer. The first adhesive layer is formed at one side of the insulating layer. The electrically conductive layer is formed at another side of the insulating layer, wherein the electrically conductive layer is in touch with an electrically conductive element of the liquid crystal display apparatus to be connected to ground.

19 Claims, 7 Drawing Sheets

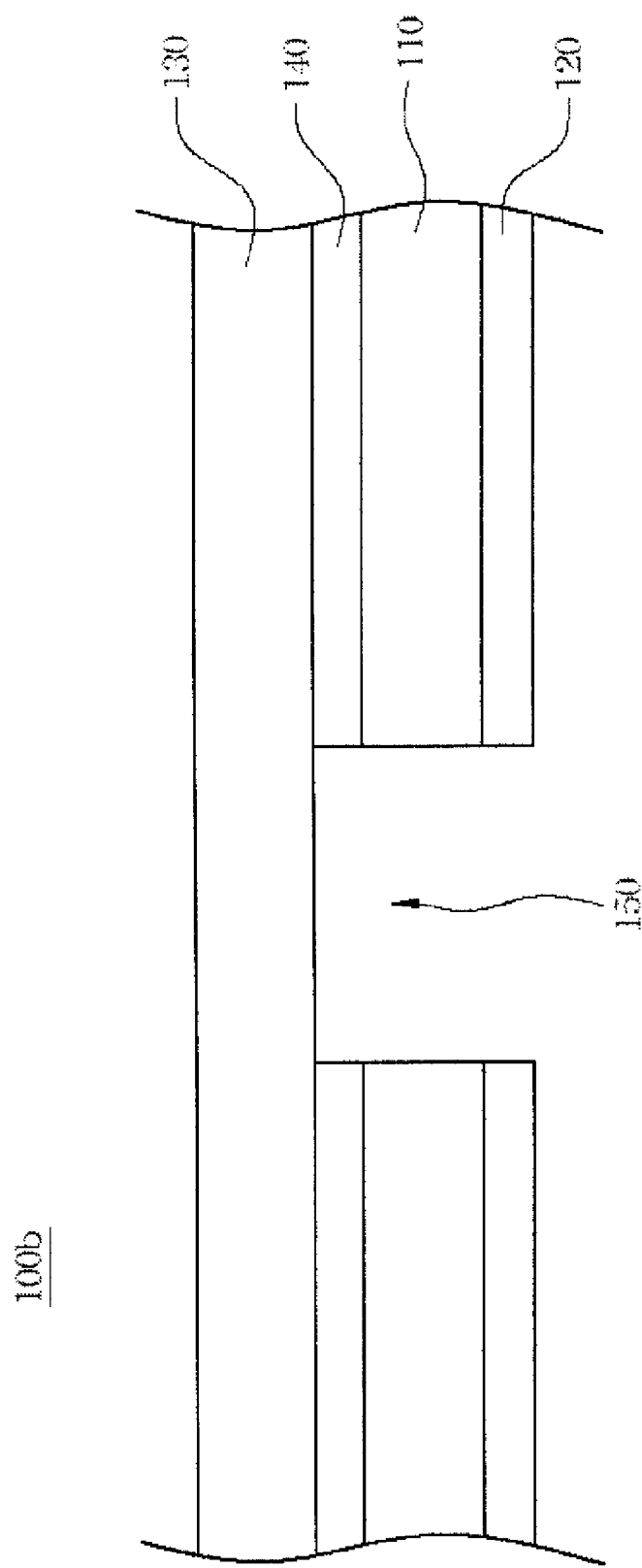

LIQUID CRYSTAL DISPLAY HAVING COMPOSITE TAPE FOR PREVENTING ELECTROSTATIC DISCHARGE DAMAGE

FIELD OF THE INVENTION

This invention relates to a liquid crystal display panel and a liquid crystal display apparatus, and more particularly, to a liquid crystal display panel and a liquid crystal display apparatus with a composite tape for preventing electrostatic discharge damage.

BACKGROUND OF THE INVENTION

Liquid crystal displays (LCD) have been widely applied in electrical products due to the rapid progress of optical and semiconductor technologies. With their advantages of high image quality, compact size, light weight, low driving voltage, low power consumption and various applications, LCDs have been introduced into portable computers, mobile phones, personal digital assistants and color televisions and are becoming the mainstream display apparatus.

Presently, electronic devices need electrostatic discharge (ESD) design to prevent being damaged by static electricity. Similarly, LCDs also have ESD design for safety.

Currently, small size LCDs can use such as double sided tape or tape to bond a liquid crystal display panel with a backlight module, thereby replacing a frame for assembling the liquid crystal display panel and the backlight module and reducing the total thickness of the LCD. At this time, to prevent a printed circuit Board (PCB) or a flexible printed circuit (FPC) of LCD from being damaged by static electricity, the tape bonded on the LCD must have a specific thickness for isolating static electricity. For example, an isolating layer of the tape on the LCD has a thickness about 0.2 mm for isolating static electricity about 15 V. However, the thicker the tape is, the thicker the total thickness of the LCD.

SUMMARY

Therefore, an aspect of the present disclosure is to provide a liquid crystal display panel and an apparatus with a composite tape to replace a frame for assembling a liquid crystal display panel and a backlight module as an LCD, thereby reducing the thickness thereof.

Another aspect of the present disclosure is to provide a liquid crystal display panel and an apparatus with a composite tape to cover at least one electronic element on the panel or the electronic connection of a printed circuit board and a flexible print circuit for preventing static electricity.

According to an embodiment of the present disclosure, the liquid crystal display apparatus comprises a liquid crystal display panel, a backlight module and a composite tape. The backlight module is oriented opposite to the liquid crystal display panel. The composite tape is adhered to the liquid crystal display panel and the backlight module, wherein the composite tape comprises an insulating layer, a first adhesive layer and an electrically conductive layer. The first adhesive layer is adjacent to a side of the insulating layer and bonds the liquid crystal display panel with the backlight module. The electrically conductive layer is adjacent to another side of the insulating layer, wherein the electrically conductive layer is in touch with an electrically conductive element of the liquid crystal display apparatus to be connected to ground.

According to another embodiment of the present disclosure, the liquid crystal display panel comprises at least one electronic element and a composite tape. The composite tape covers the electronic element, wherein the composite tape comprises an insulating layer, a first adhesive layer and an electrically conductive layer. The first adhesive layer is adjacent to one side of the insulating layer. The electrically conductive layer is adjacent to another side of the insulating layer.

Therefore, with the use of the composite tape disclosed in the embodiments of the present disclosure, the liquid crystal display panel and the backlight module may be assembled as the LCD, and static electricity can be discharged to ground. Further, the thickness of the composite tape may be reduced, and thus the total thickness of the LCD can be reduced.

BRIEF DESCRIPTION OF THE DRAWINGS

The foregoing aspects and many of the attendant advantages of this disclosure will become more readily appreciated as the same becomes better understood by reference to the following detailed description, when taken in conjunction with the accompanying drawings, wherein:

FIG. 5A is a cross-section view showing a composite tape according to a third embodiment of the present disclosure;

DETAILED DESCRIPTION

In order to make the illustration of the present disclosure more explicit and complete, the following description is stated with reference to FIG. 1 through FIG. 6.

Figure 1:
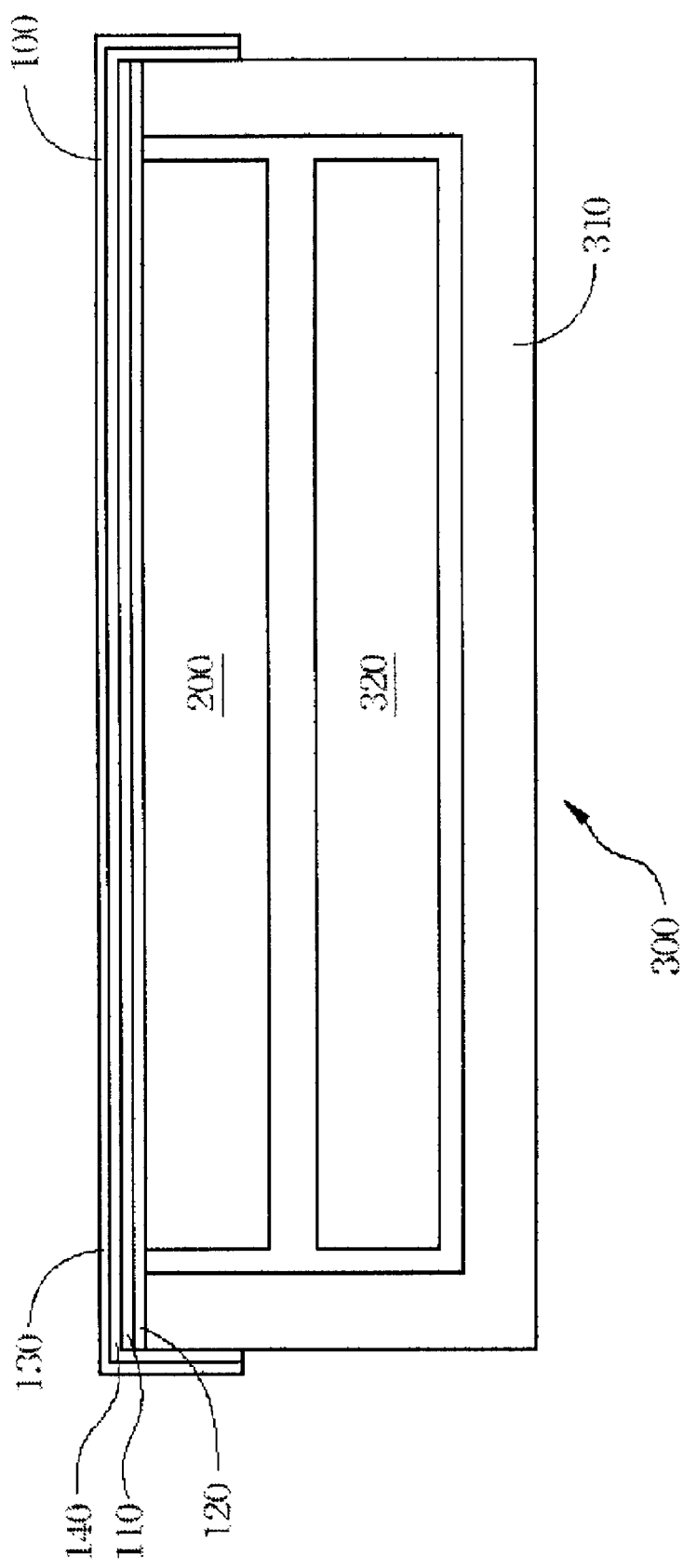
FIG. 1 is a cross-section view showing a liquid crystal display apparatus according to a first embodiment of the present disclosure.

Referring to FIG. 1, shown is a cross-section view showing a liquid crystal display apparatus according to a first embodiment of the present disclosure. The composite tape 100 of the present embodiment may shield a liquid crystal display (LCD) apparatus from static electricity. The LCD of the present embodiment may be a small size LCD comprising a liquid crystal display panel 200 and a backlight module 300 and assembled by the composite tape 100 The composite tape 100 may replacing a frame for assembly and may, in turn, reduce the total thickness of the LCD.

Figure 2:
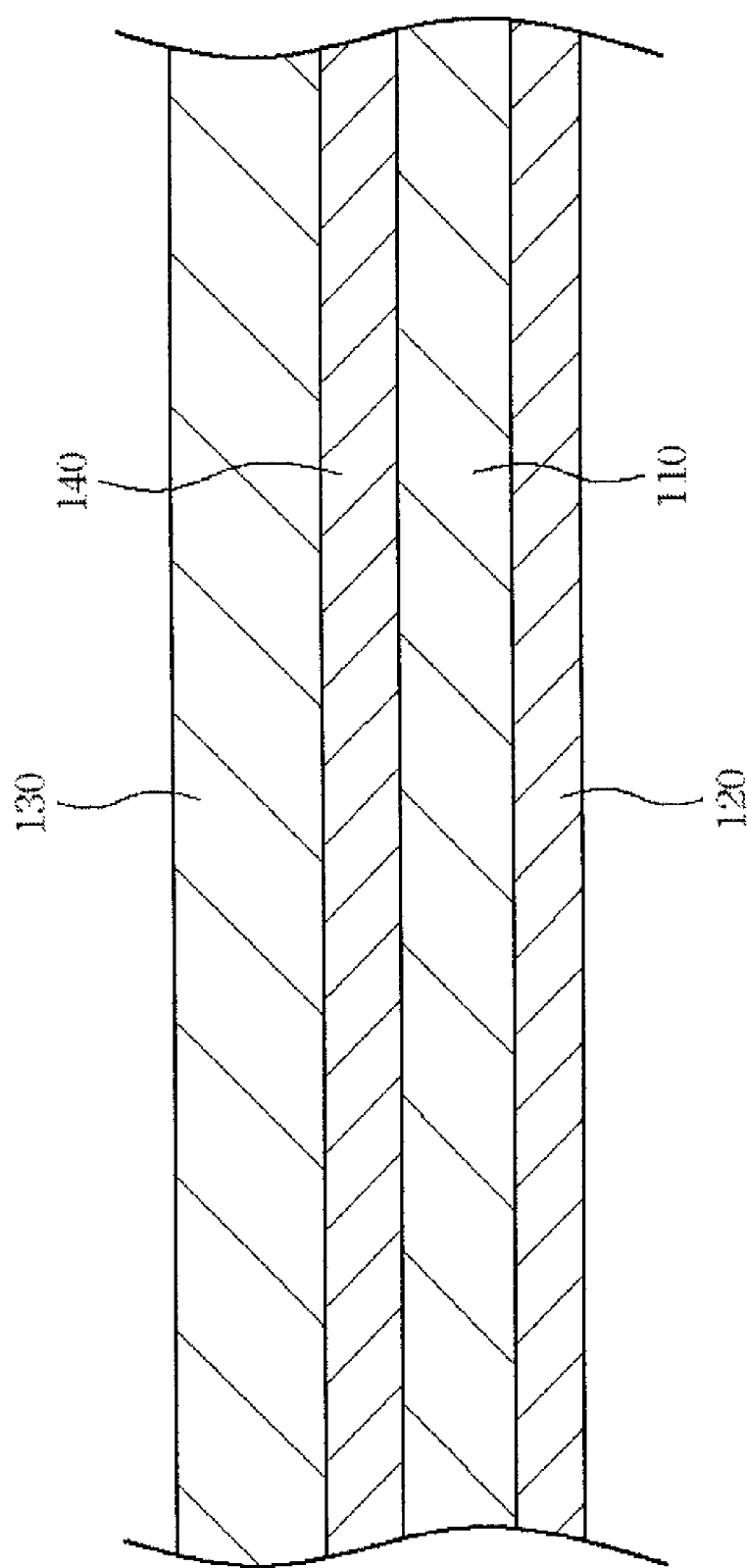
FIG. 2 is a cross-section view of the liquid crystal display apparatus in FIG. 1 showing a composite tape according to a first embodiment of the present disclosure.

The composite tape 100 of the present embodiment comprises an insulating layer 110, a first adhesive layer 120, an electrically conductive layer 130 and a second adhesive layer 140. The material of the insulating layer 110 may be plastic material, such as PU, PET, PVC, PE, PS, ABS, PMMA, or one of a variety of other plastic materials. The first adhesive layer 120 is located adjacent to a first side of the insulating layer 110, and may bond the liquid crystal display panel 200 with the backlight module 300. The combined thickness of the insulating layer 110 and the first adhesive layer 120 may be approximately 0.06 mm. The electrically conductive layer 130 may be constructed from a metal tinsel (such as Cu tinsel) bonded on a second side of the insulating layer 110 by the second adhesive layer 140, wherein the electrically conductive layer 130 is in touch with an electrically conductive element to be connected to ground, thereby shielding the circuit of LCD of the present embodiment from damage caused by static electricity. The combined thickness of the electrically conductive layer 130 and the second adhesive layer 140 may be approximately 0.08 mm. FIG. 2 illustrates a cross-sectional view of composite tape 100 disclosed in the present embodiment.

Referring again to FIG. 1, in the present embodiment, the liquid crystal display panel 200 may be bonded to the backlight module 300 using the composite tape 100. The backlight module 300 includes a rear frame 310 and a light source 320. The rear frame 310 may be constructed from metal material and may be connected to ground. The light source 320 may be cold cathode fluorescent lamp (CCFL), hot cathode fluorescent lamp (HCFL) and light emitting diode (LED), organic light emitting Diode (OLED), electro-luminescence (EL), flat fluorescent lamp (FFL) or one of a variety of other type of light sources.

As shown on FIG. 1, when assembling the liquid crystal display panel 200 and the backlight module 300, the second adhesive layer 140 may be electrically conductive. In addition, at least a segment of the electrically conductive layer 130 and at least a segment of the second adhesive layer 140 are stretched out from the composite tape 100 and bonded to the rear frame 310 (the electrically conductive element) of the backlight module 300. In various embodiments, the rear frame 310 may be grounded, whereby the electrically conductive layer 130 is also grounded. Alternatively, the electrically conductive layer 130 may be grounded by other means to discharge static electricity.

Figure 3:
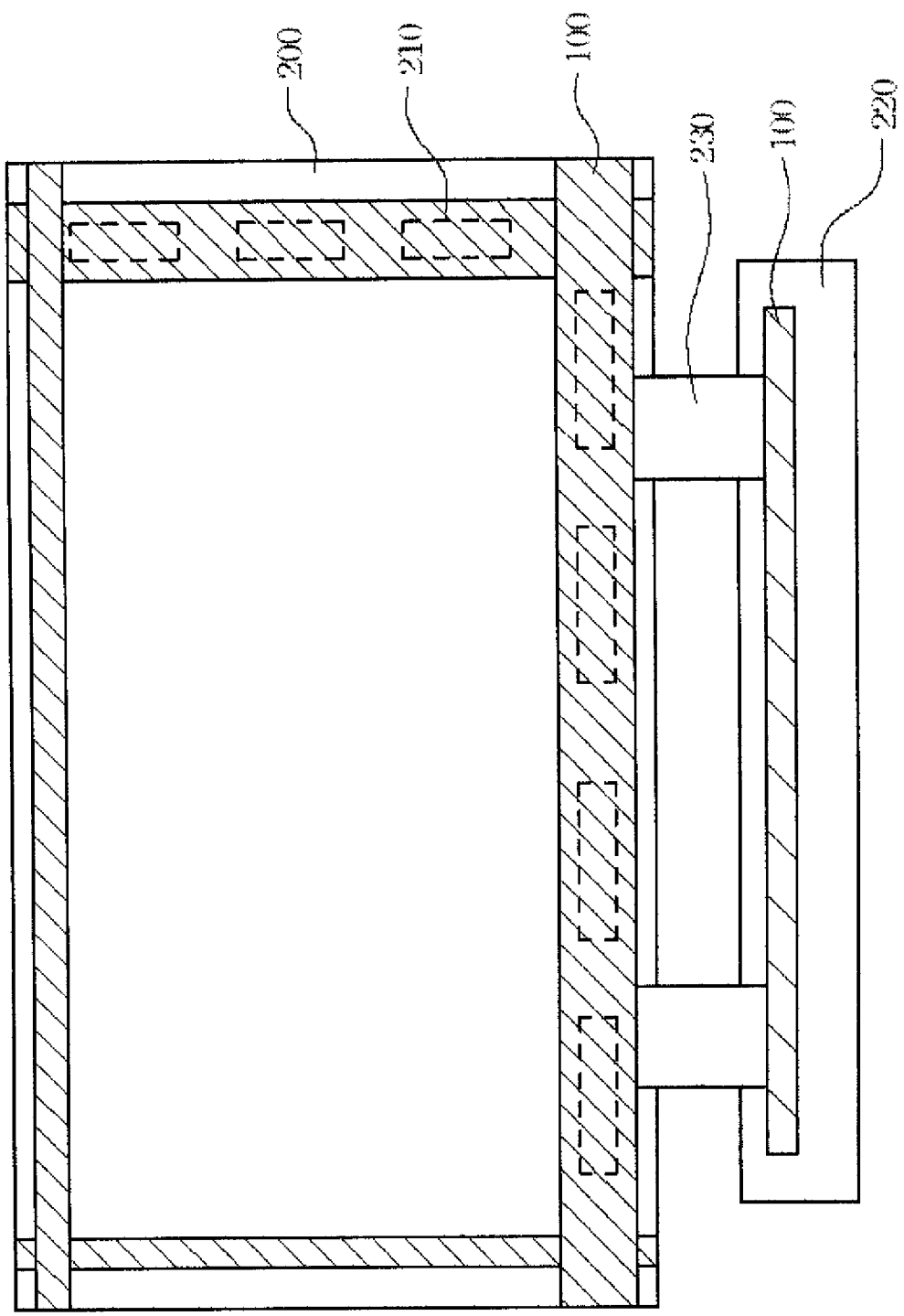
FIG. 3 is a plan view showing a liquid crystal display panel of the liquid crystal display apparatus in FIG. 1 according to a first embodiment of the present disclosure.

With regard to FIG. 3, shown is a plan view showing a liquid crystal display panel 200 according to an embodiment of the present disclosure. The composite tape 100 may cover at least one electronic element 210 of the liquid crystal display panel 200, such as a driving IC chip, to shield the electronic element 210 from the damage of static electricity. Further, when a printed circuit board (PCB) 220 is connected to the liquid crystal display panel 200 using a flexible print circuit (FPC) 230, the composite tape 100 may cover either the connection of the liquid crystal display panel 200 and the FPC 230 or the connection of the PCB 220 and the FPC 230. This may shield the circuit or electronic devices of the liquid crystal display panel 200 from the damage of static electricity.

In various embodiments, the composite tape 100 may replace a frame for assembling the liquid crystal display panel 200 and the backlight module 300 as the LCD and may shield the circuitry, electronic devices and electronic elements of the LCD from static electricity. Since the electrically conductive layer 130 of the composite tape 100 may discharge static electricity to ground, the thickness thereof may be reduced. For example, when the thickness of the composite tape 100 is approximately 0.14 mm, the composite tape 100 may prevent static electricity of approximately 8 k voltage. Therefore, the thickness of the composite tape 100 may be reduced, and the combined thickness of the LCD with the composite tape 100 may also be reduced.

Figure 4:
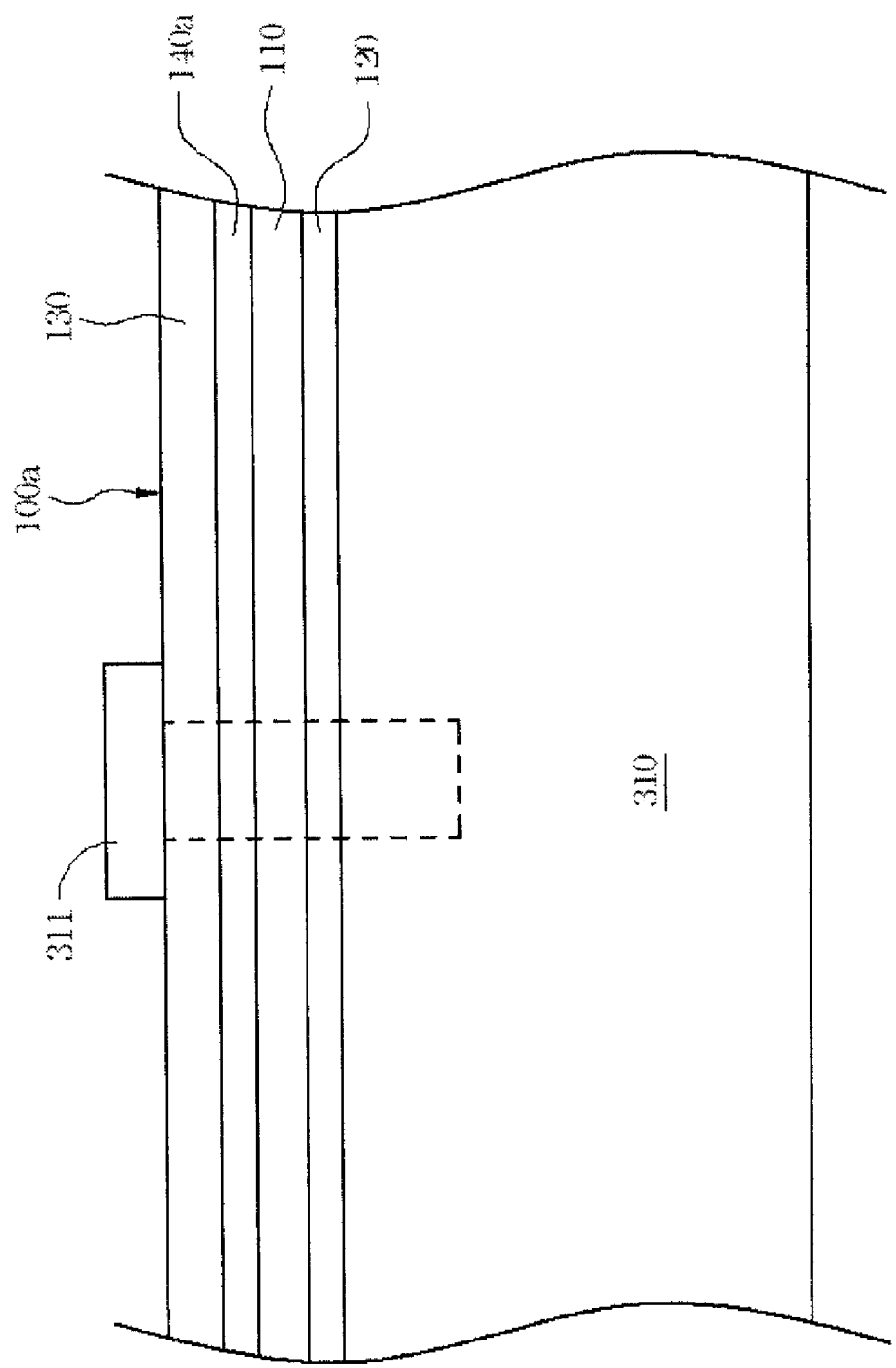
FIG. 4 is a side view showing a composite tape on a backlight module according to a second embodiment of the present disclosure.

Next, FIG. 4 illustrates a side view a composite tape on a backlight module according to a second embodiment of the present disclosure. Some reference numerals shown in the first embodiment are used in the second embodiment of the present disclosure. The construction shown in the second embodiment is similar to that in the first embodiment with respect to configuration and function, and thus is not stated in detail herein.

The second adhesive layer 140*a* of the composite tape 100*a* of the second embodiment may be not electrically conductive. The electrically conductive layer 130 of the composite tape 100*a* may be in touch with an electrically conductive element 311, such as a metal screw, mounted on the rear frame 310. Therefore, the electrically conductive layer 130 may be grounded to discharge static electricity, and the thickness of the composite tape 100*a* may be reduced.

Figure 5B:
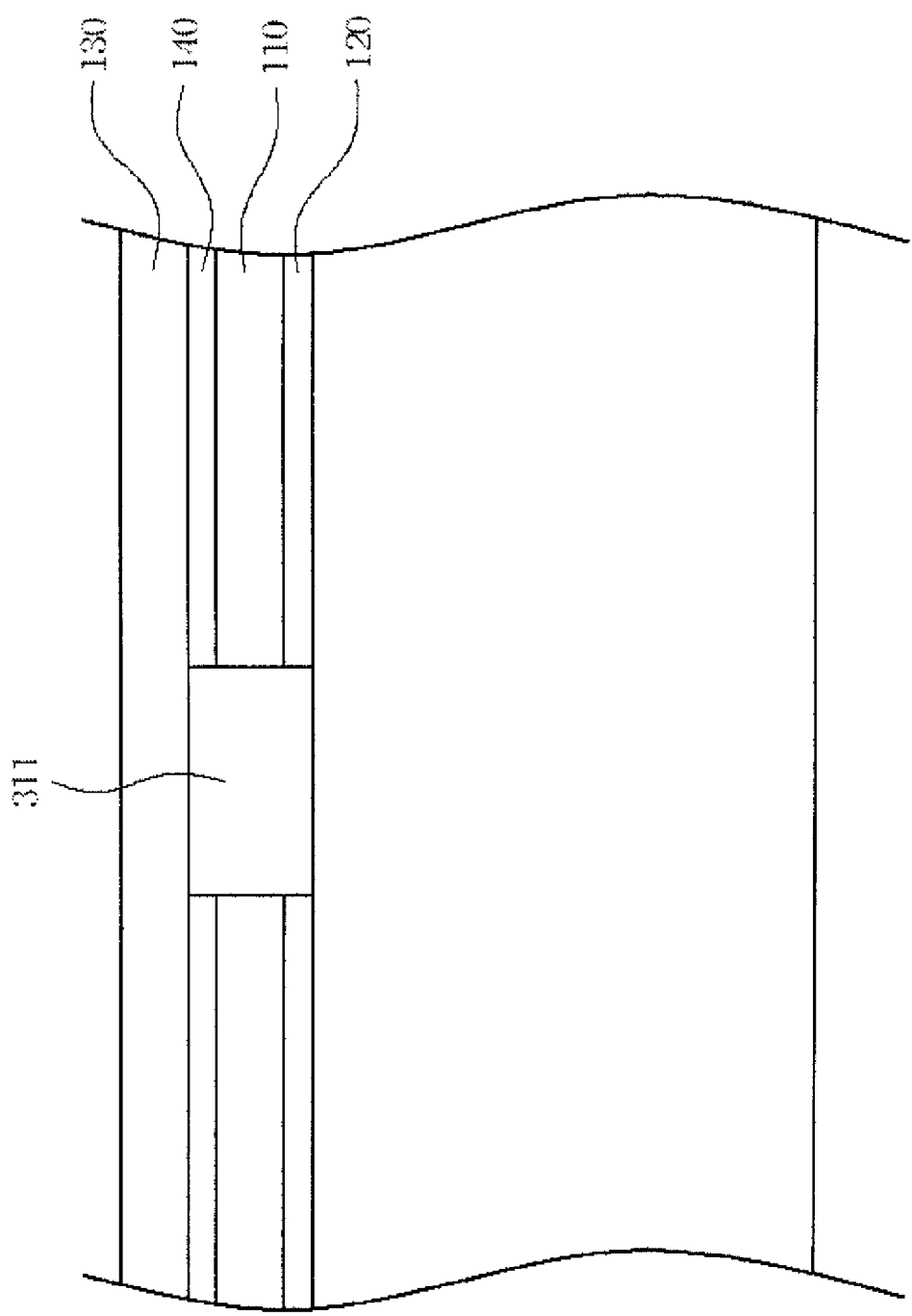
FIG. 5B is a side view showing a composite tape of FIG. 5A on a backlight module according to a third embodiment of the present disclosure.

Referring to FIG. 5A and FIG. 5B, shown is a cross-section view of a composite tape according to a third embodiment of the present disclosure and a side view of a composite tape on a backlight module according to a third embodiment of the present disclosure, respectively. Some reference numerals shown in the second embodiment are used in the third embodiment of the present disclosure. The construction shown in the third embodiment is similar to that in the second embodiment with respect to configuration and function, and thus is not stated in detail herein. The composite tape 100*b* of the third embodiment has an opening 150 formed in the insulating layer 110, the first adhesive layer 120 and the second adhesive layer 140. The opening 150 may expose the surface of the electrically conductive layer 130. The electrically conductive element 311 may be in touch with, or connected to, the electrically conductive layer 130 through the opening 150. Therefore, the electrically conductive layer 130 of the third embodiment may be grounded to discharge static electricity.

Figure 6:
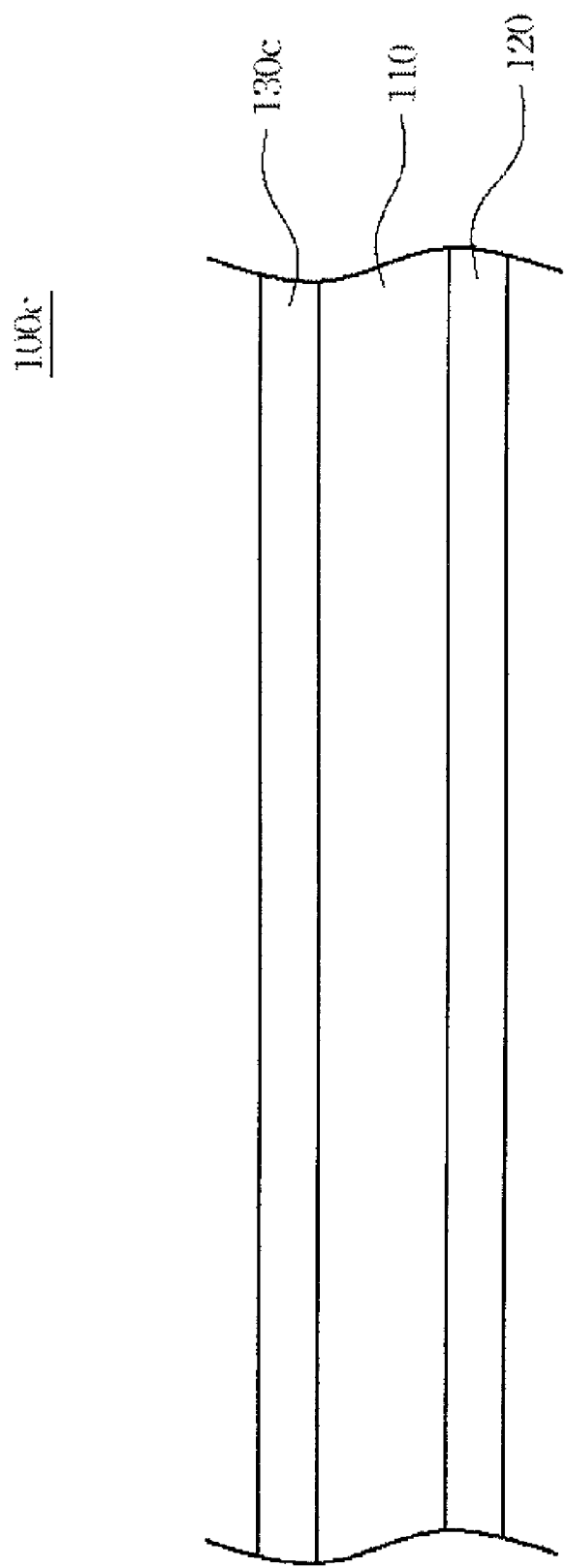
FIG. 6 is a cross-section view showing a composite tape according to a fourth embodiment of the present disclosure.

With regard to FIG. 6, shown is a cross-section view of a composite tape according to a fourth embodiment of the present disclosure. Some reference numerals shown in the first embodiment are used in the fourth embodiment of the present disclosure. The construction shown in the fourth embodiment is similar to that in the first embodiment with respect to configuration and function, and thus is not stated in detail herein. The composite tape 100*c* of the fourth embodiment may be formed on the insulating layer 110 by a method such as coating, printing, or deposition. The second adhesive layer 140 may be omitted between the insulating layer 110 and the electrically conductive layer 130*c*. For example, the electrically conductive layer 130*c* may be formed by coating a solution with an electrically conductive particle on the insulating layer 110. Further, the electrically conductive layer 130*c* may be formed on the insulating layer 110 by physical vapor deposition (PVD), such as evaporation deposition, ion plating or sputtering deposition. Since the second adhesive layer 140 may be omitted in the fourth embodiment, the thickness of the composite tape 100*c* may be reduced.

What is claimed is:

1. A liquid crystal display apparatus, comprising:
    a liquid crystal display panel, comprising at least one electronic element, wherein the electronic element is a driving IC chip;
    a backlight module oriented opposite of the liquid crystal display panel; and
    a composite tape assembled to the liquid crystal display panel and the backlight module, covering the electronic element on at least one side of the liquid crystal display panel, wherein the composite tape comprises:
    an insulating layer;
    a first adhesive layer adjacent to a first side of the insulating layer, wherein the first adhesive layer is in touch with the liquid crystal display panel and bonds the liquid crystal display panel with the backlight module; and
    an electrically conductive layer adjacent to a second side of the insulating layer, wherein the electrically conductive layer is in touch with an electrically conductive element of the liquid crystal display apparatus.

2. The liquid crystal display apparatus of claim 1, wherein the electrically conductive element is a metal rear frame.

3. The liquid crystal display apparatus of claim 1, wherein the composite tape further comprises: a second adhesive layer fashioned between the insulating layer and the electrically conductive layer.

4. The liquid crystal display apparatus of claim 3, wherein the second adhesive layer is electrically conductive.

5. The liquid crystal display apparatus of claim 4, wherein at least segment of the electrically conductive layer and at least segment of the second adhesive layer are bonded to the electrically conductive element.

6. The liquid crystal display apparatus of claim 3, wherein a combined thickness of the electrically conductive layer and the second adhesive layer is approximately 0.08 mm.

7. The liquid crystal display apparatus of claim 1, wherein the composite tape further comprises: an opening formed in the insulating layer and, the first adhesive layer, wherein the opening exposes the surface of the electrically conductive layer, and the electrically conductive element is in touch with the electrically conductive layer through the opening.

8. The liquid crystal display apparatus of claim 1, wherein the insulating layer is constructed from a plastic material.

9. The liquid crystal display apparatus of claim 1, wherein a combined thickness of the insulating layer and the first adhesive layer is approximately 0.06 mm.

10. The liquid crystal display apparatus of claim 1, wherein a thickness of the composite tape is approximately 0.14 mm.

11. The liquid crystal display apparatus of claim 1, wherein the electrically conductive layer constructed from a 0 metal tinsel.

12. The liquid crystal display apparatus of claim 1, wherein the liquid crystal display panel includes a printed circuit board electrically connected to the liquid crystal display panel by using a flexible print circuit, and the composite tape covers either the electrical connection of the liquid crystal display panel and the flexible print circuit or the composite tape covers the electrical connection of the printed circuit board and the flexible print circuit.

13. The liquid crystal display apparatus of claim 1, wherein the electrically conductive layer is formed by coating a solution with an electrically conductive particle on the insulating layer.

14. The liquid crystal display apparatus of claim 1, wherein the electrically conductive layer is formed by printing.

15. The liquid crystal display apparatus of claim 1, wherein the electrically conductive layer is formed by a physical vapor deposition.

16. A liquid crystal display apparatus, comprising:
   a liquid crystal display panel, comprising at least one electronic element, wherein the electronic element is a driving IC chip; and
   a composite tape covering the electronic element on at least one side of the liquid crystal display panel, wherein the composite tape comprises:
   an insulating layer;
   a first adhesive layer adjacent to a first side of the insulating layer and in touch with the liquid crystal display panel; and
   an electrically conductive layer adjacent to a second side of the insulating layer.

17. The liquid crystal display apparatus of claim 16, further comprising:
   a printed circuit board connected to the liquid crystal display panel by way of a flexible print circuit.

18. The liquid crystal display apparatus of claim 17, wherein the connection of the liquid crystal display panel and the flexible print circuit is covered by the composite tape.

19. The liquid crystal display apparatus of claim 17, wherein the connection of the printed circuit board and the flexible print circuit is covered by the composite tape.

* * * * *